United States Patent
Wang et al.

(10) Patent No.: US 9,578,483 B2
(45) Date of Patent: Feb. 21, 2017

(54) TERAHERTZ WIRELESS COMMUNICATIONS-BASED METHOD AND SYSTEM FOR DATA TRANSMISSION

(71) Applicant: HUIZHOU TCL MOBILE COMMUNICATION CO., LTD, Huizhou (CN)

(72) Inventors: Kailong Wang, Huizhou (CN); Xianglai Li, Huizhou (CN); Qi Ge, Huizhou (CN)

(73) Assignee: HUIZHOU TCL MOBILE COMMUNICATION CO., LTD., Hui Zhou (CN)

(*) Notice: Subject to any disclaimer, the term of this patent is extended or adjusted under 35 U.S.C. 154(b) by 0 days.

(21) Appl. No.: 14/370,396

(22) PCT Filed: Mar. 12, 2013

(86) PCT No.: PCT/CN2013/072475
§ 371 (c)(1),
(2) Date: Jul. 2, 2014

(87) PCT Pub. No.: WO2013/155907
PCT Pub. Date: Oct. 24, 2013

(65) Prior Publication Data
US 2015/0017916 A1    Jan. 15, 2015

(30) Foreign Application Priority Data
Apr. 19, 2012  (CN) .......................... 2012 1 0115961

(51) Int. Cl.
*H04W 8/00* (2009.01)
*H04W 4/00* (2009.01)
*H04W 76/02* (2009.01)

(52) U.S. Cl.
CPC ............ *H04W 8/005* (2013.01); *H04W 4/008* (2013.01); *H04W 76/023* (2013.01)

(58) Field of Classification Search
None
See application file for complete search history.

(56) References Cited

U.S. PATENT DOCUMENTS

2008/0003978 A1* 1/2008 Sengupta et al. ............ 455/410
2009/0244015 A1* 10/2009 Sengupta et al. ............ 345/173
(Continued)

FOREIGN PATENT DOCUMENTS

CN      101102129 A    1/2008
EP       1905125 B1    9/2009

OTHER PUBLICATIONS

Office Action dated Jul. 16, 2014 in CN application serial No. 201210115961.8.

*Primary Examiner* — Alejandro Rivero
(74) *Attorney, Agent, or Firm* — Shimokaji IP

(57) ABSTRACT

A first terahertz storage device and a second terahertz storage device may be placed within an effective distance to each other, and, by connection and pairing between the first terahertz storage device and the second terahertz storage device, data in the first terahertz storage device may be transmitted to the second terahertz storage device via a terahertz wireless signal. Accordingly, rapid and secure transmission of data is facilitated between two storage devices. Transmission and exchange of data is, thereby, facilitated in a scenario in which a transmission medium cannot be released.

16 Claims, 3 Drawing Sheets

(56) References Cited

U.S. PATENT DOCUMENTS

| | | | |
|---|---|---|---|
| 2010/0315954 A1* | 12/2010 | Singh et al. | 370/241 |
| 2011/0276715 A1* | 11/2011 | King | 709/235 |
| 2012/0117045 A1* | 5/2012 | Carlock | G06F 17/30563 |
| | | | 707/706 |
| 2013/0015971 A1* | 1/2013 | Caporizzo | G08B 13/1427 |
| | | | 340/539.32 |
| 2013/0019057 A1* | 1/2013 | Stephens | G06F 12/00 |
| | | | 711/103 |
| 2013/0185559 A1* | 7/2013 | Morel et al. | 713/168 |
| 2013/0297936 A1* | 11/2013 | Khosravi et al. | 713/168 |

* cited by examiner

TERAHERTZ WIRELESS COMMUNICATIONS-BASED METHOD AND SYSTEM FOR DATA TRANSMISSION

TECHNICAL FIELD

The present disclosure relates to the field of information technology, and in particular, to terahertz wireless communications-based methods and systems for data transmission.

BACKGROUND

Traditional data types are often represented by structured data which can be realized through logical expression of a two-dimensional table structure. A traditional data transmission mode, based on wired transmission relational database, may be capable to adapt to this type of data. However, with the advent of the mobile Internet era, data on microblogs, online communities, emails and PPTs presents an outburst growth. Data on mobile Internet devices often includes "unstructured" and "bulky" characteristics. Traditional data transmission modes, based on wired transmission relational databases, require wired transmission, which has limited data handling capacity, slow data transmission rate, and cannot adapt to the demands of new data characteristics.

SUMMARY

Terahertz wireless communications-based methods and a systems are provided.

A terahertz wireless communications-based method for data transmission may include placing a second terahertz storage device within a terahertz wireless signal search range of a first terahertz storage device, wherein the first terahertz storage device and the second terahertz storage device mutually detect whether the opposite side has a function of transmitting data through a terahertz wireless signal. If both the first and the second terahertz storage device detect mutually that the opposite side includes a function to transmitting data through a terahertz wireless signal, connection and pairing may be performed between the first terahertz storage device and the second terahertz storage device. When a connection and paring are successful the first terahertz storage device may send data to the second terahertz storage device through a terahertz wireless signal according to a user instruction.

In another embodiment, a terahertz wireless communications-based method for data transmission may include placing a second terahertz storage device within a terahertz wireless signal search range of a first terahertz storage device, and performing connection and pairing between the first and the second terahertz storage device. When a connection and paring are successful the first terahertz storage device may send data to the second terahertz storage device through a terahertz wireless signal according to the user instruction.

In a further embodiment, a terahertz wireless communications-based system for data transmission may include a first terahertz storage device connected and paired with a second terahertz storage device, and sending data to the second terahertz storage device via a terahertz wireless signal according to a user instruction. The system may further include a second terahertz storage device for receiving the data sent by the first terahertz storage device via the terahertz wireless signal.

Terahertz wireless communications-based methods and systems for data transmission may implement rapid transmission of data between two storage devices, may implement a novel data interactive model in a terahertz storage device and/or may perform data interaction quickly, stably and securely. The methods and systems may implement optimization on a physical structure of a product based on wireless transmission, thus may allow completion of transmission and exchange of the data in a scenario in which a transmission medium cannot be released. The methods and systems may provide a bulk transmission service manager, which may manage an unstructured bulk data transmission process when being compared with a traditional relational database, and may meet demands of unstructured bulk data processing and mining.

DETAILED DESCRIPTION

Terahertz wireless communications-based methods and systems for data transmission are provided. To make the objectives, technical solutions and advantages clear, the methods and systems are described in detail with reference to the accompanying drawings. It should be understood that the specific embodiments described herein are for illustrative purposes and are not intended to limit the claimed invention in any way.

Terahertz wireless communications-based methods and systems for data transmission may include a first terahertz storage device and a second terahertz storage device placed within an effective distance of each other and, by means of connection and pairing between the first terahertz storage device and the second terahertz storage device, may transmit data in the first terahertz storage device to the second terahertz storage device via a terahertz wireless signal.

Figure 1:
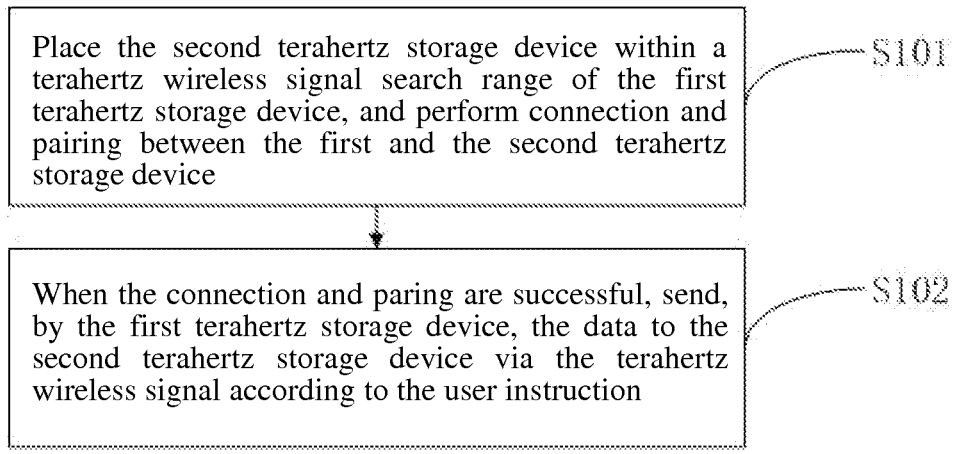
FIG. 1 depicts a flow chart of an example terahertz wireless communications-based method for data transmission.

Turning to FIG. 1, a flow chart of an example terahertz wireless communications-based method for data transmission may include, when data transmission is required, placing a second terahertz storage device within a terahertz wireless signal search range of a first terahertz storage device, and performing connection and pairing between the first terahertz storage device and the second terahertz storage device.

A first terahertz storage device and a second terahertz storage device may support terahertz wireless communications. A first terahertz storage device and a second terahertz storage device may be respectively referred to as a first node and a second node. High speed data transmission may be performed between the two nodes. Data transmission may be bilateral. A second terahertz storage device may transmit data to a first terahertz storage device. Data may be unstructured bulk data. A second terahertz storage device may be a common mobile optical disk, a mobile hard disk, a mobile flash memory or an intelligent terminal. A second terahertz storage device may receive data from a first terahertz storage device. A first terahertz storage device may be a bulk storage database in which bulk data may be stored. A bulk storage database may include multiple overlying business functions, thus a relationship between the bulk storage database and an ordinary storage device may be a master-slave relationship between a server and a client. A bulk storage database may be a node that is equivalent to other storage devices, and all the data transmission between any two nodes may be a point-to-point coordinating relationship. Therefore, a first terahertz storage device may transmit data to a second terahertz storage device and the second terahertz storage device may also transmit data stored therein to the first terahertz storage device.

A first and second terahertz storage device may be placed within a certain distance of one another, wherein the distance may be an effective distance of terahertz wireless communications. A coverage area of a terahertz wireless signal may be limited, thus terahertz storage devices may be placed within an effective distance such that connection and pairing, data transmission, and the like may be performed.

First and second terahertz storage devices may validate each other so as to guarantee security of the data transmission. When a connection and pairing between a first and second terahertz storage device are not successful, a connection and pairing error may be prompted. Alternatively, or additionally, a dialog may be presented to a user. Subsequent to a connection and pairing failure, a user may select whether to perform connection and pairing again. A prompting body may be either a first or second terahertz storage device. When a connection and pairing between first and second terahertz storage devices are successful, a data transmission process may be performed.

When connection and paring are successful, data may be sent by a first terahertz storage device to a second terahertz storage device using a terahertz wireless signal according to a user instruction. When connection and paring between a first and second terahertz storage device are successful, a connection may be established between the first and second terahertz storage device, and data transmission may be performed according to a user instruction. A data transmission may be performed using a terahertz wireless signal. A terahertz (Thz) wave may be a terahertz ray. A terahertz ray may be an electromagnetic wave having an electromagnetism frequency between 0.1 THz and 10 THz (wavelength is between 3 mm and 30 um), and a wave range between microwave and far infrared rays. Based on the characteristics of larger transmission capacity and better directivity of a terahertz (THz) wireless communications, a transmission rate of a terahertz wave may reach 10 Gbps. Therefore, a terahertz wave may include transmission of structured bulk data. Terahertz wireless communications may implement data transmission quickly, securely and stably.

Point-to-point data transmission may be implemented. A first terahertz transmission device may transmit data to a plurality of second terahertz transmission devices at the same time, thus, improving data transmission efficiency.

Figure 2:
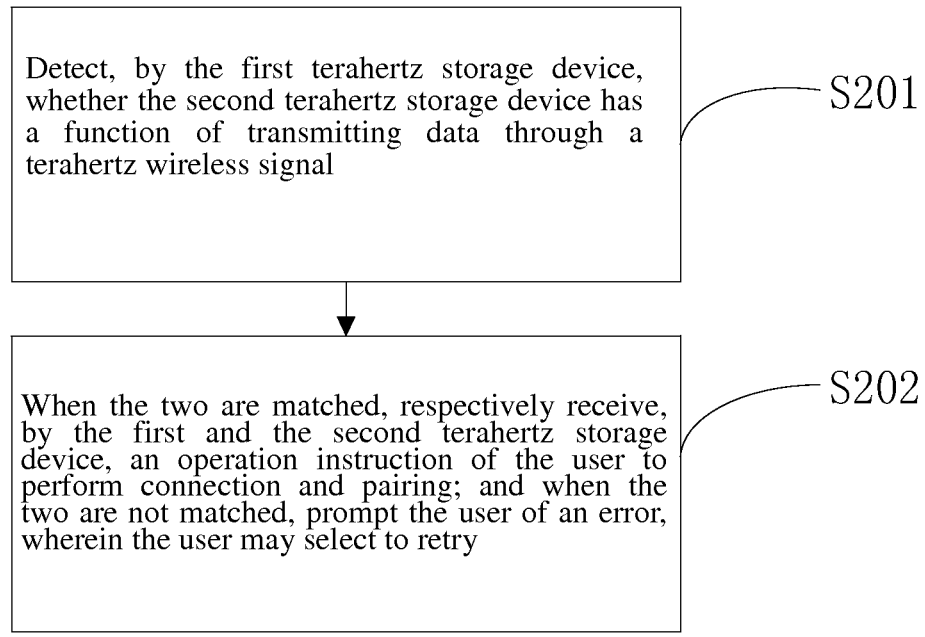
FIG. 2 depicts a flow chart of an example connecting and pairing process for use in the terahertz wireless communications-based method for data transmission shown in FIG. 1.

With reference to FIG. 2, a flow chart of an example connection and pairing process for use in a terahertz wireless communications-based method for data transmission is depicted. The process may include detecting, by a first terahertz storage device, whether a second terahertz storage device includes a function for transmitting data through a terahertz wireless signal.

When a first and second terahertz storage device are placed within an effective distance, the first terahertz storage device may detect whether the second terahertz storage device is effective. The former may detect whether the latter may receive or send data through a terahertz wireless signal. The process may be mutual. A second terahertz storage device may detect whether a first terahertz storage device is effective.

When a first terahertz storage device and second terahertz storage device are matched, the first and the second terahertz storage devices may respectively receive an operation instruction from a user to perform connection and pairing. When a first terahertz storage device and second terahertz storage device are not matched, a user may be presented with an error. Subsequent to an initial failure to be matched, a user may select to retry.

When a second terahertz storage device is an effective one, the connection and pairing may be performed between a first terahertz storage device and the second terahertz storage device. Pairing may be performed through exchanging pairing codes between first and second terahertz storage devices. Pairing code exchange may refer to two devices mutually validating pairing codes. When pairing codes of first and second terahertz storage devices are identical to each other, the two may be mutually validated. Security validation for data transmission may be acquired such that data transmission may be performed securely. A connection and pairing process may ensure security and reliability of a data transmission. When it is detected that a second terahertz storage device does not have a function for transmitting data through a terahertz wireless signal, invalidity of the second terahertz storage device may be presented to a user, and the user may select whether to retry.

Figure 3:
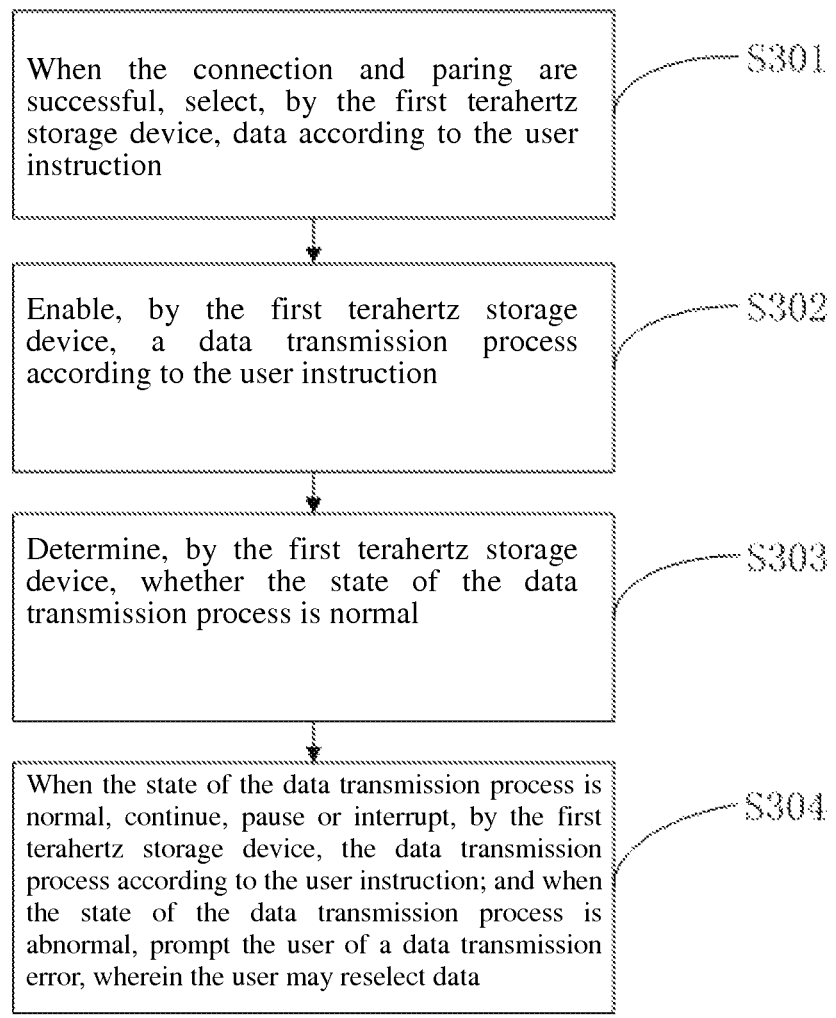
FIG. 3 depicts a flow chart of an example data transmission process for use in the terahertz wireless communications-based method for data transmission shown in FIG. 1.

Turning to FIG. 3, a flow chart of an example data transmission process for use in a terahertz wireless communications-based method for data transmission is depicted. When connection and paring are successful, a first terahertz storage device may select data according to a user instruction. A user may select data to be transmitted in advance, and a first terahertz storage device may select data according to the selection of the user.

A data transmission process may include enabling a first terahertz storage device according to a user instruction. Subsequent to a user selecting data to be transmitted, a first terahertz storage device may prompt the user whether to enable a data transmission process, and may perform a data transmission process if the user selects yes. Alternatively a user, after finding that selected data is wrong, may select to not enable a data transmission process, and may correct data for transmission.

A data transmission process may include determining, by a first terahertz storage device, whether a state of a data transmission process is normal. For example, a first terahertz storage device may determine whether a state of a data transmission process is normal. Indices for reference may include transmission progress, transmission rate, and the like. A user may view whether a data transmission process is normal, and when a problem exists, the user may correct the problem.

When a state of a data transmission process is normal, a first terahertz storage device may continue, pause or interrupt the data transmission process according to a user instruction. When a state of a data transmission process is abnormal, a user may be presented a data transmission error and/or may be prompting to retry data transmission. Subsequent to an initial data transmission error, a user may reselect data so as to realize data transmission. A user may be provided with an application interactive interface on which the user may perform such operations as enabling, pausing or interrupting a data transmission process. A first terahertz storage device may prompt a user of a state and a parameter of a data transmission process. For example, a user may be prompted with some related indexes, such as transmission progress, transmission rate, error instruction, remaining time or file path, etc.

A first terahertz storage device may function as a master. A second terahertz storage device may function as a master. A user may operate a second terahertz storage device, and the second terahertz storage device may enable, continue, pause or interrupt a data transmission process according to a user instruction. Alternatively, a second terahertz storage device may detect a state of a data transmission process. Two terahertz storage devices operate as peer nodes, rather than in a master-slave relationship.

Figure 4:
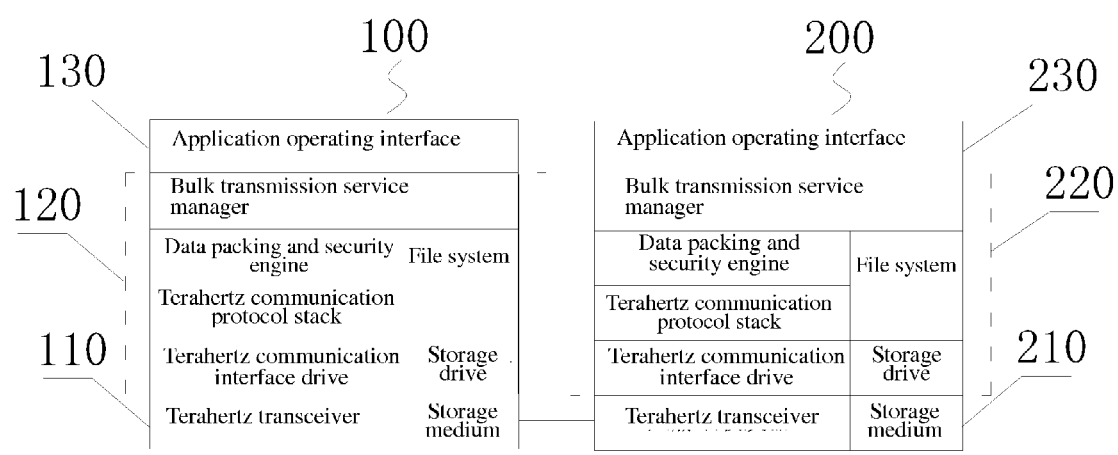
FIG. 4 depicts a structure diagram of an example terahertz wireless communications-based system for data transmission.

With reference to FIG. 4, a terahertz wireless communications-based system may include a first terahertz storage device 100 and a second terahertz storage device 200. A first terahertz storage device 100 may be connected and paired with a second terahertz storage device 200, and may send data to the second terahertz storage device 200 using a terahertz wireless signal according to a user instruction. A second terahertz storage device 200 may be used for receiving data sent by a first terahertz storage device. A second terahertz storage device 200 may be within a terahertz wireless signal search range of the a terahertz storage device 100.

A first terahertz storage device 100 and a second terahertz storage device 200 may be storage devices that support terahertz wireless communications. A first terahertz storage device 100 and a second terahertz storage device 200 may be provided with three function units: a first function unit, a second function unit and a third function unit. As shown in FIG. 4, in order to distinguish conveniently, a first function unit, a second function unit and a third function unit of a first terahertz storage device 100 may be respectively marked as 110, 120 and 130, and a first function unit, a second function unit and a third function unit of a second terahertz storage device 200 are respectively marked as 210, 220 and 230. A first and second terahertz storage device may be terahertz devices having similar structures and principles, thus, only a first function unit 110, a second function unit 120 and a third function unit 130 of a first terahertz storage device are described.

A first function unit 110 may be a hardware layer, which may include a terahertz transceiver and storage medium, wherein the terahertz transceiver may be used for receiving and sending data using a terahertz wireless signal, and the storage medium may be used for storing the data. A storage medium may be a non-volatile data medium, such as a mobile hard disk, a mobile optical disk, a mobile flash memory or an intelligent terminal and the like.

A second function unit 120 may be a software layer, which may be used for implementing a function of a first function unit, such as a hardware layer. A second function unit may include a terahertz communication interface drive, a terahertz protocol stack, a data packing and security engine, a file system and/or a storage drive.

A terahertz communication interface drive may be used for controlling a terahertz transceiver to receive and send data. A terahertz transceiver may be used for receiving and sending data. A terahertz protocol stack may be used for performing protocol layer data processing on data. For example, a terahertz protocol stack may be used for performing such protocol layer data processing as pairing, retransmission, unpacking or recombination and the like. A data packing and security engine may be used for packing, unpacking, encrypting and decrypting data, which may include packing, unpacking, encrypting and decrypting original data from view of transmission efficiency and security.

A store function may follow an existing storage mode. For example, a storage drive may call a file access interface of a storage medium for a file system. A file system may provide a standard file access interface, such as a bulk transmission service manager or an application interactive interface, to a top-level function layer in an operating system.

When a terahertz storage device externally transmits a data file, a storage drive may call a file access interface of a storage medium for a file system so as to read data stored in a storage medium. Data, after reading, may be transmitted to a data packing and security engine through a standard file access interface of a file system. Transmitted data may be packed and encrypted by a data packing and security engine and may flow in a terahertz communication protocol stack. After a terahertz communication protocol stack performs protocol layer data processing on data, a terahertz communication interface drive may control a terahertz transceiver to send the data. When a terahertz storage device receives data, a terahertz communication interface drive may control a terahertz transceiver to receive the data, and may process the data using a terahertz communication protocol stack. Afterwards, data may be decrypted and unpacked by a data packing and security engine module to acquire original data. Data may be written in a storage medium through a file system and storage drive, thus, implementing storage of the data.

A third function unit 130 may be an application interactive interface for user operation. A user may perform such operations as enabling, pausing or interrupting a data transmission process on an application interactive interface. During a data transmission process, a first terahertz storage device may prompt a user of a state and a parameter of a data transmission process. For example, a user may be presented some related indexes, such as transmission progress, transmission rate, error instruction, remaining time or file path, etc.

A second function unit 120 may include a specialized service layer which may manage a data transmission function of a terahertz storage device. A service layer may be referred to is called as a bulk transmission service manager. A bulk transmission service manager may be responsible for performing priority scheduling on data to be transmitted, and particularly, may manage unstructured bulk data. For example, a bulk transmission service manager may preferentially transmit important or urgent data according to situations when a first terahertz storage device transmits a lot of bulk data to a second terahertz storage device. When a terahertz storage device externally transmits a data file, a bulk transmission service manager may call a file access interface of a file system to read the data. Data to be read may be packed and encrypted by a data packing and security engine and may flow in a terahertz communication protocol stack. A terahertz communication protocol stack may perform protocol layer data processing on the data, and a terahertz communication interface drive may control a terahertz transceiver to send the data. A terahertz storage device may receive a data file according to a reverse of the foregoing process, wherein a terahertz communication interface drive may receive data, and may process the data using a terahertz communication protocol stack. Afterwards, data may be decrypted and unpacked by a data packing and security engine module to acquire original data, and the data may be written in a storage medium through a file system and a storage drive, thus, implementing storage of the data.

Compared with traditional relational databases, a bulk transmission service manager may manage an unstructured bulk data transmission process and meet demands of unstructured bulk data processing and mining. Data may be based on unstructured bulk data, which may be information stored in a file system rather than a database. In mobile Internet development, a growing rate of unstructured data is far greater than that of structured data (e.g., data based on a relational database). A method for data transmission of the present disclosure may be based on unstructured bulk data, which caters to the mobile Internet development trend, and can better meet demands of unstructured bulk data processing and mining.

Terahertz wireless communications-based methods and systems for data transmission may include a first terahertz storage device and a second terahertz storage device placed within an effective distance to each other, and, by means of connection and pairing between the first terahertz storage device and the second terahertz storage device, data in the first terahertz storage device may be transmitted to the second terahertz storage device via a terahertz wireless signal. Rapid transmission of data between storage devices is implemented, matched with a novel data interactive model in a terahertz storage device, and may perform data interaction quickly, stably and securely. In addition, optimization on a physical structure of a product may be implemented using wired transmission, thus, allowing completion of transmission and exchange of data in a scenario in which a transmission medium cannot be released.

It should be understood that applications of the claimed invention are not limited to the foregoing examples. A person having ordinary skill in the art may improve or transform the claimed invention according to the foregoing descriptions. Accordingly all improvements and transformations shall fall within the protection scope of the claims.

We claim:

1. A terahertz wireless communications-based method for data transmission, comprising:
    placing a plurality of second terahertz storage devices within a terahertz wireless signal search range of a first terahertz storage device, wherein the first and the plurality of second terahertz storage devices automatically and mutually detect whether an opposite side has a function of transmitting data through a terahertz wireless signal in response to the plurality of second terahertz storage devices being placed within the terahertz wireless signal search range of the first terahertz storage device, and wherein the first and the plurality of second terahertz storage devices are at least one of: an optical disk, a hard disk, or a flash memory;
    if both the first terahertz storage device and the plurality of second terahertz storage devices detect mutually that the opposite side has the function of transmitting data through the terahertz wireless signal, automatically connecting and pairing are performed between the first and the plurality of second terahertz storage devices without user interaction; and
    when the connection and pairing are successful, transmitting, by the first terahertz storage device, data to the plurality of second terahertz storage devices at a same time by point-to-point transmission using a terahertz wireless signal, and according to a user interaction continuing, pausing, interrupting or retrying the transmitting;
    wherein the first terahertz storage device and the plurality of second terahertz storage devices are in a master and slave relationship and the first terahertz storage device is the master.

2. The terahertz wireless communications-based method for data transmission according to claim 1, wherein when the connection and pairing are successful, selecting, by the first terahertz storage device, data according to a user instruction;
    enabling, by the first terahertz storage device, a data transmission process according to the user instruction;
    determining, by the first terahertz storage device, whether a state of a data transmission process is normal; and
    if the state of the data transmission process is normal, controlling, by the first terahertz storage device, the data transmission process according to the user instruction; and if the state of the data transmission process is abnormal, prompting the user of a data transmission error.

3. The terahertz wireless communications-based method for data transmission according to claim 2, wherein if the state of the data transmission process is normal, the first terahertz storage device further prompts the user of the state and a parameter of the data transmission process.

4. The terahertz wireless communications-based method for data transmission according to claim 1, wherein when the connection and pairing are performed between the first and the plurality of second terahertz storage devices, pairing is performed through exchanging pairing codes; when pairing codes of the first and the plurality of second terahertz storage devices are identical, the connection and pairing are successful.

5. The terahertz wireless communications-based method for data transmission according to claim 1, wherein the first terahertz storage device includes at least one of: a mobile hard disk, a mobile optical disk, a mobile flash memory or an intelligent terminal.

6. A terahertz wireless communications-based method for data transmission, comprising:
    placing a plurality of second terahertz storage devices within a terahertz wireless signal search range of a first terahertz storage device, and performing connection and pairing between the first and the plurality of second terahertz storage devices;
    when the connection and pairing are successful, automatically sending, by the first terahertz storage device, unstructured bulk data to the plurality of second terahertz storage devices at a same time by point-to-point transmission, using a terahertz wireless signal, in response to the plurality of second terahertz storage devices being placed within the terahertz wireless signal search range of the first terahertz storage device;
    wherein the unstructured bulk data to be automatically sent is determined by a user prior to the connection and pairing of the first and the plurality of second terahertz storage devices; and
    presenting to a user an invalidity of the plurality of second terahertz storage devices based on an absence of a function therein for transmitting data through a terahertz wireless signal.

7. The terahertz wireless communications-based method for data transmission according to claim 6, wherein performing connection and pairing between the first and the plurality of second terahertz storage devices includes:
    detecting, by the first terahertz storage device, whether the plurality of second terahertz storage devices has a function for transmitting data using a terahertz wireless signal; and if the plurality of second terahertz storage devices has the function for transmitting data using a terahertz wireless signal, performing connection and pairing between the first and the plurality of second terahertz storage devices respectively by accepting an operation instruction from the user; and if the plurality of second terahertz storage devices does not have the function for transmitting data using a terahertz wireless signal, prompting the user of an error.

8. The terahertz wireless communications-based method for data transmission according to claim 6, wherein when the connection and pairing are successful, selecting, by the first terahertz storage device, data according to a user instruction;
enabling, by the first terahertz storage device, a data transmission process according to the user instruction;
determining, by the first terahertz storage device, whether a state of the data transmission process is normal; and
if the state of the data transmission process is normal, controlling, by the first terahertz storage device, the data transmission process according to the user instruction; and if the state of the data transmission process is abnormal, prompting the user of a data transmission error.

9. The terahertz wireless communications-based method for data transmission according to claim 8, wherein if the state of the data transmission process is normal, the first terahertz storage device further prompts the user of the state and a parameter of the data transmission process.

10. The terahertz wireless communications-based method for data transmission according to claim 6, wherein when the connection and pairing are performed between the first and the plurality of second terahertz storage devices, pairing is performed through exchanging pairing codes; when pairing codes of the first and the plurality of second terahertz storage devices are identical, the connection and pairing are successful.

11. The terahertz wireless communications-based method for data transmission according to claim 6, wherein the plurality of second terahertz storage devices includes at least one of: a mobile hard disk, a mobile optical disk, a mobile flash memory or an intelligent terminal.

12. A terahertz wireless communications-based system for data transmission, comprising:
a first terahertz storage device connected and paired with a plurality of second terahertz storage devices, the first terahertz storage device sending data to the plurality of second terahertz storage devices at a same time by point-to-point transmission using a terahertz wireless signal according to a user instruction, wherein the data is automatically encrypted in response to the plurality of second terahertz storage devices being placed within the terahertz wireless signal search range of the first terahertz storage device; and
the plurality of second terahertz storage devices receives the data sent by the first terahertz storage device to the plurality of second terahertz storage devices at the same time using the terahertz wireless signal; and
wherein both the first and the plurality of second terahertz storage devices are provided with three function units: a first function unit, a second function unit and a third function unit, wherein:
the first function unit is a hardware layer which comprises a terahertz transceiver and a storage medium, wherein the terahertz transceiver is used for receiving and sending the data using a terahertz wireless signal, and the storage medium is used for storing the data;
the second function unit is a software layer for implementing the function of the first function unit comprising a bulk transmission service manager that manages data transmission including prioritizing data and preferentially transmitting the prioritized data; and
the third function unit is an application interactive interface for user interaction configured for prompting a user for an invalidation of the plurality of second terahertz storage devices and a wired transmission when a terahertz transmission cannot be released.

13. The terahertz wireless communications-based system for data transmission according to claim 12, wherein the second function unit comprises a terahertz communication interface drive, a terahertz protocol stack, a data packing and security engine, a file system and a storage drive, wherein:
the terahertz communication interface drive controls a terahertz transceiver to receive and send data;
the terahertz communication protocol stack performs protocol layer data processing on data transmitted by the data packing and security engine and the terahertz transceiver;
the data packing and security engine performs corresponding processing on data transmitted by the file system and the terahertz communication protocol stack; and
the file system and the storage drive call in the data in the storage medium.

14. The terahertz wireless communications-based system for data transmission according to claim 13, wherein the file system and the storage drive store packed and encrypted data in a storage medium.

15. The terahertz wireless communications-based system for data transmission according to claim 12, wherein the application interactive interface controls a data transmission process according to the user instruction, and the application interactive interface further provides a state and a parameter of the data transmission process.

16. The terahertz wireless communications-based system for data transmission according to claim 12, wherein the first terahertz storage device and the plurality of second terahertz storage devices includes at least one of: a mobile hard disk, a mobile optical disk, a mobile flash memory or an intelligent terminal.

* * * * *